United States
Tojyo

4,146,304
Mar. 27, 1979

[54] MICROSCOPE OBJECTIVE
[75] Inventor: Tsutomu Tojyo, Hachiouji, Japan
[73] Assignee: Olympus Optical Co., Ltd., Tokyo, Japan
[21] Appl. No.: 832,371
[22] Filed: Sep. 12, 1977
[30] Foreign Application Priority Data
Sep. 17, 1976 [JP] Japan ................. 51-111452
[51] Int. Cl.² .................. G02B 9/34; G02B 21/02
[52] U.S. Cl. ........................ 350/175 ML; 350/220
[58] Field of Search ............ 350/175 ML, 225, 220
[56] References Cited
U.S. PATENT DOCUMENTS 3,507,554 4/1970 Benford .................. 350/175 ML
3,598,473 8/1971 Shoemaker ............. 350/175 ML

*Primary Examiner*—Conrad J. Clark
*Attorney, Agent, or Firm*—Cushman, Darby & Cushman

[57] ABSTRACT

A microscope objective comprising a first, second, third and fourth lens components, in which the first lens component is a biconcave lens, the second lens component is a biconvex lens, the third lens component is a positive cemented meniscus doublet, the fourth lens component is a positive lens, and satisfying the following conditions for which N. A. is large, working distance is long and flatness of image is favorable.

$$0.15 < |r_2/r_1|, \ 0.5 < |r_5/r_7| < 2.5 \tag{1}$$

$$0.4d_4 < d_3/n_2 + d_5/n_3 + d_6/n_4 < 3.5d_4 \tag{2}$$

$$d_2 < 2.5 d_3/n_2 \tag{3}$$

$$\nu_1 > 55, \ n_1 < 1.58 \tag{4}$$

$$\nu_2 < 50, \ n_2 > 1.70$$

$$35 < |\nu_4 - \nu_3|, \ \nu_4 > 60 \tag{5}$$

$$n_3 < 1.70$$

6 Claims, 6 Drawing Figures

MICROSCOPE OBJECTIVE

BACKGROUND OF THE INVENTION (a) Field of the Invention

The present invention relates to a microscope objective and, more particularly, to a microscope objective with low magnification.

(b) Description of the Prior Art

For known plan-type microscope objectives with low magnification about X4, it is impossible to make the working distance satisfactorily long when it is attempted to obtain favourable flatness of image and the working distance is about 6.8 mm. Besides, for this kind of microscope objectives, N. A. is generally about 0.1.

SUMMARY OF THE INVENTION

It is, therefore, a primary object of the present invention to provide a microscope objective with low magnification for which N. A. is 0.13 and, at the same time, the working distance is satisfactorily long, i.e., 14.9 mm.

The microscope objective according to the present invention has lens configuration as shown in FIG. 1. It comprises four lens components, i.e., the first, second, third and fourth lens components from the object side in which the first lens component is a biconcave lens, the second lens component is a biconvex lens, the third lens component is a positive cemented meniscus doublet, and the fourth lens component is a positive lens. Besides, the microscope objective according to the present invention satisfied the following conditions when reference symbols $r_1$ and $r_2$ respectively represent radii of curvature of respective surfaces of the first lens component, reference symbols $r_5$ and $r_7$ respectively represent radii of curvature of the surface on the object side and surface on the image side of the third lens component, reference symbol $d_3$ represents the thickness of the second lens component, reference symbols $d_5$ and $d_6$ respectively represent thicknesses of respective lenses constituting the third lens component, reference symbol $d_2$ represents the airspace between the first and second lens components, reference symbol $d_4$ represents the airspace between the second and third lens components, reference symbols $n_1$, $n_2$, $n_3$ and $n_4$ respectively represent refractive indices of the first lens component, second lens component and respective lenses constituting the third lens component, and reference symbols $\nu_1$, $\nu_2$, $\nu_3$ and $\nu_4$ respectively represent Abbe's numbers of the first lens component, second lens component and respective lenses constituting the third lens component.

$$0.15 < |r_2/r_1|, 0.5 < |r_5/r_7| < 2.5 \quad (1)$$

$$0.4d_4 < d_3/n_2 + d_5/n_3 + d_6/n_4 < 3.5d_4 \quad (2)$$

$$d_2 < 2.5\, d_3/n_2 \quad (3)$$

$$\nu_1 > 55,\, n_1 < 1.58$$

$$\nu_2 < 50,\, n_2 > 1.70 \quad (4)$$

$$35 < |\nu_4 - \nu_3|,\, \nu_4 > 60$$

$$n_3 < 1.70 \quad (5)$$

Out of the above conditions, the condition (1) is required for the purpose of making the working distance long and numerical aperture large. If it becomes $0.15 > |r_2/r_1|$ in the condition (1), astigmatism will be considerably aggravated. If it becomes $0.5 > |r_5/r_7|$, the astigmatic difference will become large and coma will be aggravated. If it becomes $|r_5/r_7| > 2.5$, the astigmatic difference will become large.

If the value defined by the condition (2) becomes smaller than the lower limit of the condition (2), coma will become considerably unfavourable. Besides, the objective according to the present invention is of compensation type for which lateral chromatic aberration is left to some extent and it is corrected by the eyepiece. If the above-mentioned value becomes smaller than the lower limit, it becomes difficult to arrange so that lateral chromatic aberration is caused to the extent that it matches the eyepiece. If the above-mentioned value becomes larger than the upper limit of the condition (2), lateral chromatic aberration will become larger than the value suitable for the eyepiece though coma will become favourable. Besides, the length of microscope objectives is limited by the adjustment length of objective. If the above-mentioned value becomes larger than the upper limit, the length of objective will become larger than the adjustment length (die Abgleichlänge) of objective.

If, in the condition (3), the airspace $d_2$ between the first and second lens components becomes larger than $2.5\, d_3/n_2$, lateral chromatic aberration will become too large and it will become impossible to correct it only by selection of materials for respective lenses and radii of curvature of respective lens surfaces. Besides, the airspace $d_2$ is very effective for correction of spherical aberration. If, therefore, $d_2$ becomes larger than the upper limit, spherical aberration will be overcorrected.

The condition (4) is established for the purpose of keeping the flatness of image favourably by correcting spherical aberration and lateral chromatic aberration in well-balanced state. If any of the values defined by the condition (4) becomes larger or smaller than the corresponding limit, spherical aberration will be undercorrected and Petzval's sum will become unfavourable. If $\nu_1$ or $\nu_2$ becomes larger or smaller than the limit defined in the condition (4), lateral chromatic aberration will be unbalanced.

The condition (5) relates to the third lens component which is a cemented doublet. If the difference of dispersion of respective lenses constituting the cemented doublet becomes smaller than 35 or Abbe's number $\nu_4$ of the biconvex lens constituting the third lens component becomes smaller than 60, it will become impossible to correct chromatic aberration favourably. If the refractive index $n_3$ of the concave lens in the third lens component becomes larger than 1.70, spherical aberration, astigmatism and Petzval's sum will become large.

DETAILED DESCRIPTION OF THE PREFERRED EMBODIMENTS

Figure 1:
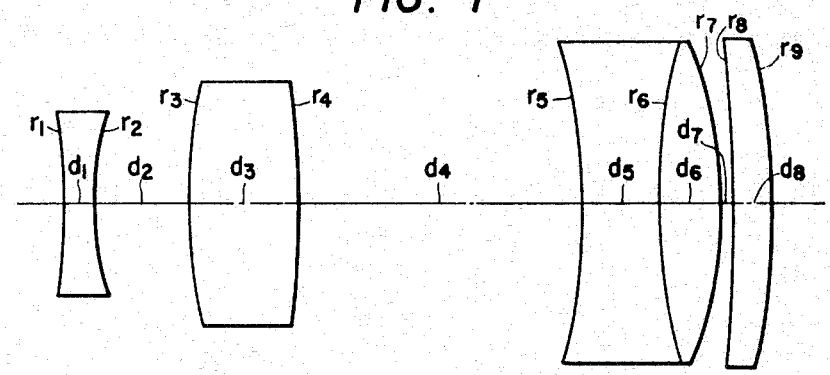
FIG. 1 shows a sectional view of the microscope objective according to the present invention.
Figure 2:
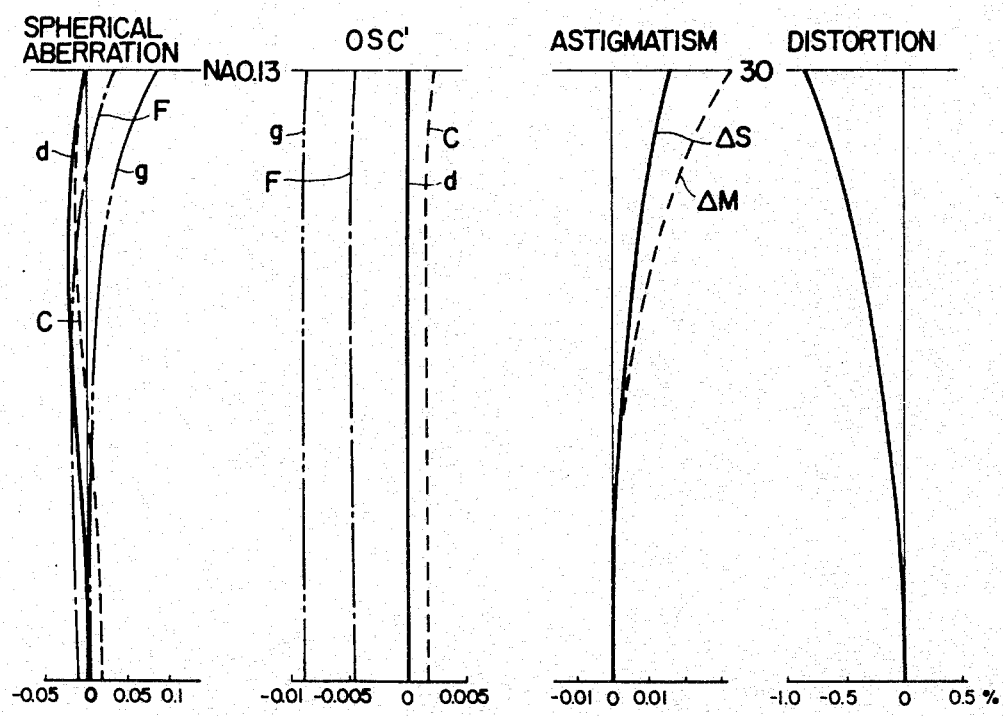
FIG. 2 shows graphs illustrating aberration curves of Embodiment 1 of the microscope objective according to the present invention.
Figure 3:
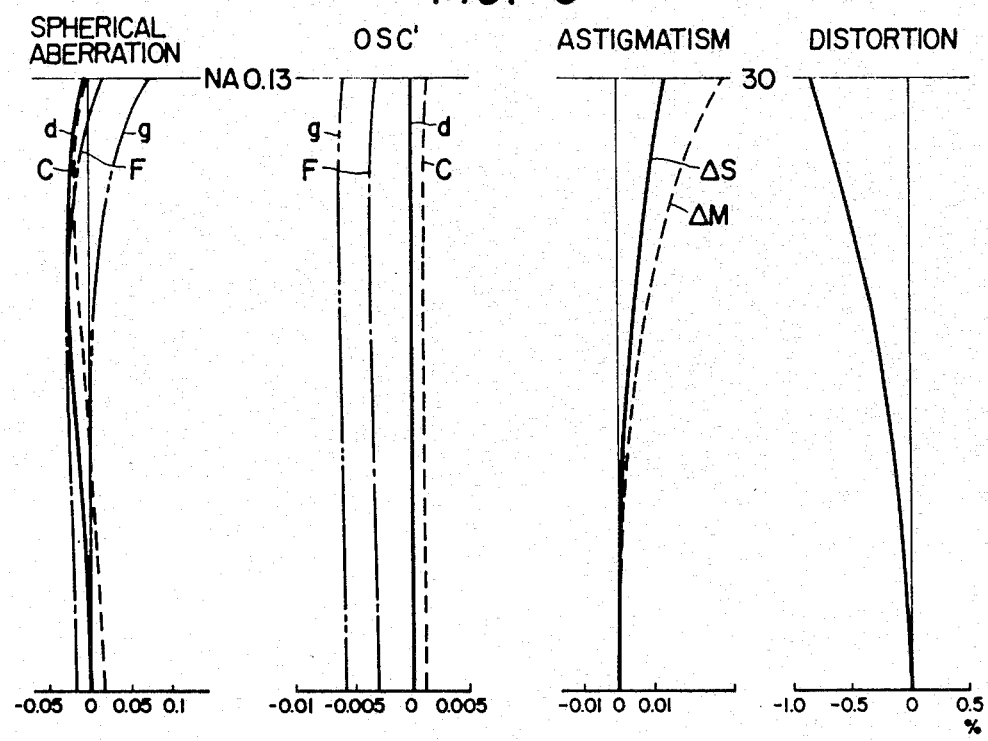
FIG. 3 shows graphs illustrating aberration curves of Embodiment 2.
Figure 4:
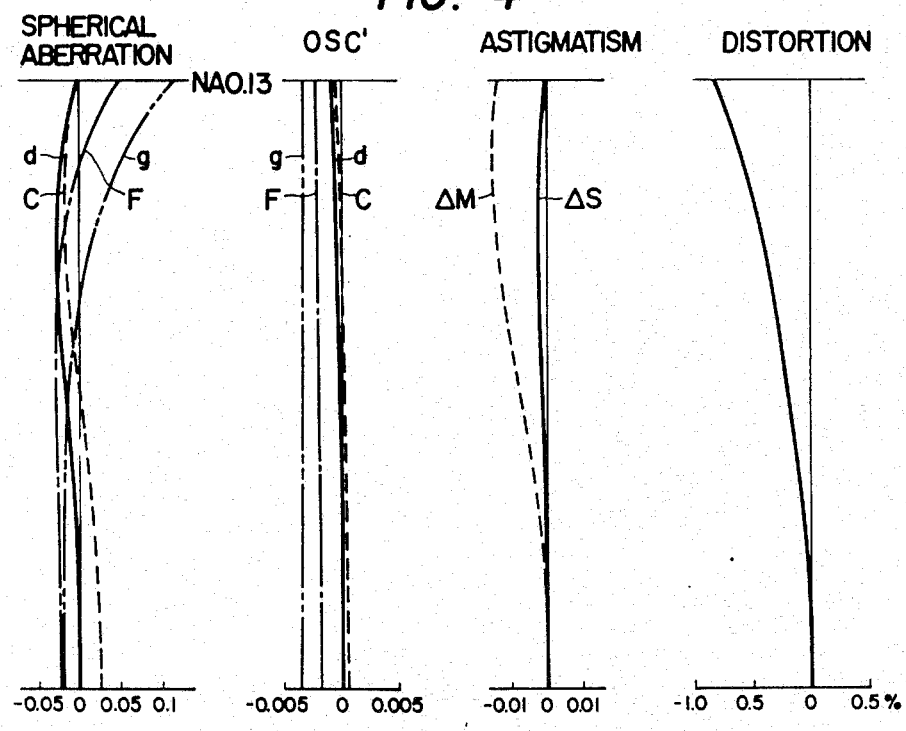
FIG. 4 shows graphs illustrating aberration curves of Embodiment 3.
Figure 5:
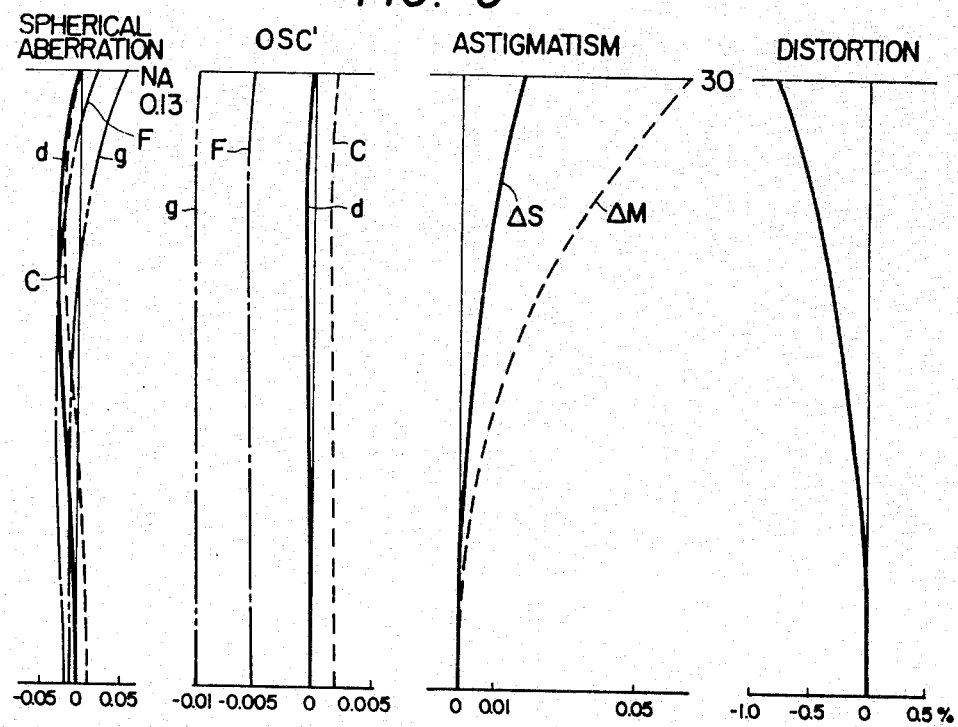
FIG. 5 shows graphs illustrating aberration curves of Embodiment 4.
Figure 6:
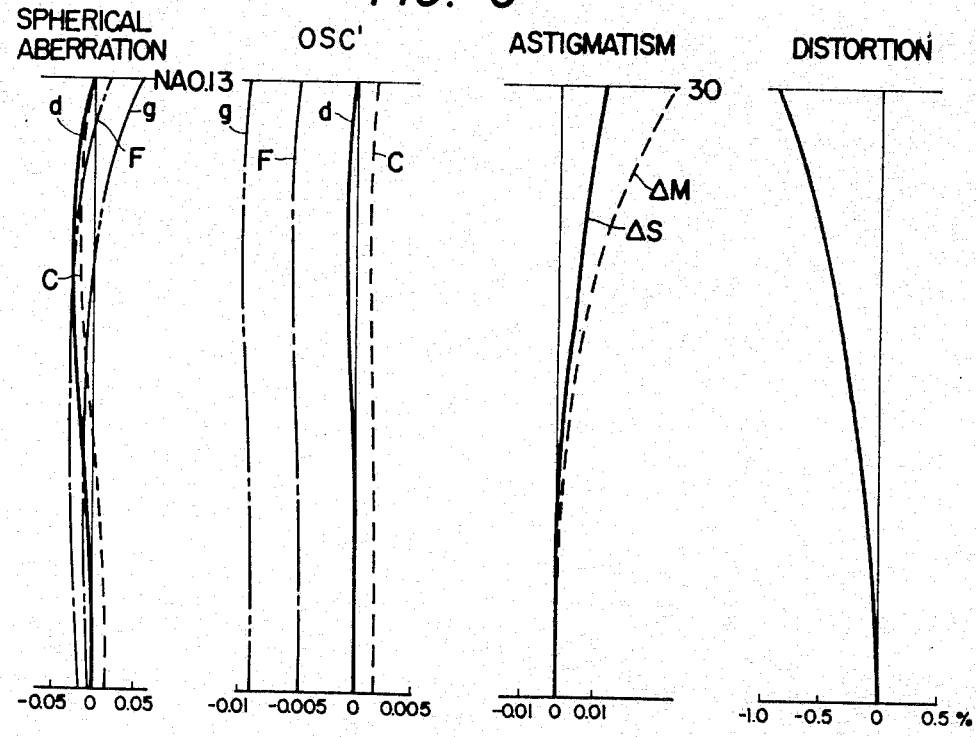
FIG. 6 shows graphs illustrating aberration curves of Embodiment 5.

Preferred embodiments of the microscope objective according to the present invention explained in the above are as shown below.

Embodiment 1
$f = 1.0$    N.A. $= 0.13$    $\beta = -4x$
W.D. $= 0.5114$    Petzval's sum $= -0.08$
$r_1 = -0.6871$
$\quad d_1 = 0.0351 \quad n_1 = 1.48749 \quad \nu_1 = 70.15$
$r_2 = 0.3159$
$\quad d_2 = 0.1183$
$r_3 = 0.8103$
$\quad d_3 = 0.1291 \quad n_2 = 1.83400 \quad \nu_2 = 37.19$
$r_4 = -1.1821$
$\quad d_4 = 0.3404$
$r_5 = -0.7925$
$\quad d_5 = 0.0869 \quad n_3 = 1.62588 \quad \nu_3 = 35.70$
$r_6 = 0.6727$
$\quad d_6 = 0.0817 \quad n_4 = 1.49250 \quad \nu_4 = 81.90$
$r_7 = -0.4608$
$\quad d_7 = 0.0035$
$r_8 = -10.7743$
$\quad d_8 = 0.0526 \quad n_5 = 1.51728 \quad \nu_5 = 69.56$
$r_9 = -0.9174$ Embodiment 2
$f = 1.0$    N.A. $= 0.13$    $\beta = -4X$
W.D. $= 0.5115$    Petzval's sum $= -0.06$
$r_1 = -0.7588$
$\quad d_1 = 0.0351 \quad n_1 = 1.48749 \quad \nu_1 = 70.15$
$r_2 = 0.3113$
$\quad d_2 = 0.1183$
$r_3 = 0.7592$
$\quad d_3 = 0.1292 \quad n_2 = 1.83481 \quad \nu_2 = 42.82$
$r_4 = -1.4720$
$\quad d_4 = 0.3387$
$r_5 = -0.9547$
$\quad d_5 = 0.0958 \quad n_3 = 1.60342 \quad \nu_3 = 38.01$
$r_6 = 0.5966$
$\quad d_6 = 0.0829 \quad n_4 = 1.49250 \quad \nu_4 = 81.90$
$r_7 = -0.5126$
$\quad d_7 = 0.0035$
$r_8 = -5.2782$
$\quad d_8 = 0.0361 \quad n_5 = 1.50378 \quad \nu_5 = 66.81$
$r_9 = -0.8206$ Embodiment 3
$f = 1.0$    N.A. $= 0.13$    $\beta = -4X$
W.D. $= 0.5199$    Petzval's sum $= -0.055$
$r_1 = -0.8971$
$\quad d_1 = 0.0697 \quad n_1 = 1.48749 \quad \nu_1 = 70.15$
$r_2 = 0.6692$
$\quad d_2 = 0.00003$
$r_3 = 1.4099$
$\quad d_3 = 0.1396 \quad n_2 = 1.74000 \quad \nu_2 = 31.70$
$r_4 = -0.5093$
$\quad d_4 = 0.0959$
$r_5 = -0.2325$
$\quad d_5 = 0.2006 \quad n_3 = 1.63636 \quad \nu_3 = 35.37$
$r_6 = 0.9615$
$\quad d_6 = 0.1771 \quad n_4 = 1.49700 \quad \nu_4 = 81.34$
$r_7 = -0.3576$
$\quad d_7 = 0.0027$
$r_8 = 10.1088$
$\quad d_8 = 0.0950 \quad n_5 = 1.48749 \quad \nu_5 = 70.15$
$r_9 = -0.7544$ Embodiment 4
$f = 1.0$    N.A. $= 0.13$    $\beta = -4X$
W.D. $= 0.5162$    Petzval's sum $= 0.04$
$r_1 = -1.1505$
$\quad d_1 = 0.0625 \quad n_1 = 1.51874 \quad \nu = 64.48$
$r_2 = 0.2795$
$\quad d_2 = 0.1045$
$r_3 = 0.6033$
$\quad d_3 = 0.1342 \quad n_2 = 1.74000 \quad \nu_2 = 31.70$
$r_4 = -1.3191$
$\quad d_4 = 0.2508$
$r_5 = -1.0020$
$\quad d_5 = 0.1141 \quad n_3 = 1.64769 \quad \nu_3 = 33.80$
$r_6 = 0.5857$
$\quad d_6 = 0.1004 \quad n_4 = 1.49250 \quad \nu_4 = 81.90$
$r_7 = -0.4545$
$\quad d_7 = 0.0276$
$r_8 = -2.2735$
$\quad d_8 = 0.0514 \quad n_5 = 1.49250 \quad \nu_5 = 81.90$
$r_9 = -0.7324$ Embodiment 5
$f = 1.0$    N.A. $= 0.13$    $\beta = -4X$
W.D. $= 0.5179$    Petzval's sum $= -0.05$
$r_1 = -0.6594$
$\quad d_1 = 0.0631 \quad n_1 = 1.48749 \quad \nu^1 = 70.15$
$r_2 = 0.2964$
$\quad d_2 = 0.1058$
$r_3 = 0.6718$
$\quad d_3 = 0.1347 \quad n_2 = 1.78300 \quad \nu_2 = 36.15$
$r_4 = -1.0697$
$\quad d_4 = 0.2585$
$r_5 = -1.0457$
$\quad d_5 = 0.1200 \quad n_3 = 1.64769 \quad \nu_3 = 33.80$
$r_6 = 0.5717$
$\quad d_6 = 0.1088 \quad n_4 = 1.49250 \quad \nu_4 = 81.90$
$r_7 = -0.4812$
$\quad d_7 = 0.0283$
$r_8 = -2.4230$
$\quad d_8 = 0.0521 \quad n_5 = 1.48749 \quad \nu_5 = 70.15$
$r_9 = -0.0521$ In the above embodiments, reference symbol f represents the focal length of the lens system as a whole, reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

I claim:

1. A microscope objective comprising a first, second, third and fourth lens components, said first lens component being a biconcave lens, said second lens component being a biconvex lens, said third lens component being a positive cemented meniscus doublet consisting of a biconcave lens and biconvex lens, said fourth lens component being a positive lens, said microscope objective satisfying the following conditions:

$$0.15 < |r_2/r_1|, 0.5 < |r_5/r_7| < 2.5 \tag{1}$$

$$0.4d_4 < d_3/n_2 + d_5/n_3 + d_6/n_4 < 3.5d_4 \tag{2}$$

$$d_2 < 2.5 \, d_3/n_2 \tag{3}$$

$$\nu_1 > 55, n_1 < 1.58$$

$$\nu_2 < 50, n_2 > 1.70 \tag{4}$$

$$35 < |\nu_4 - \nu_3|, \nu_4 > 60$$

$$n_3 < 1.70 \tag{5}$$

wherein reference symbols $r_1$ and $r_2$ respectively represent radii of curvature of respective surfaces of the first lens component, reference symbols $r_5$ and $r_7$ respectively represent radii of curvature of the surface on the object side and surface on the image side of the third lens component, reference $d_3$ represents the thickness of the second lens component, reference symbols $d_5$ and $d_6$ respectively represent thicknesses of respective lenses constituting the third lens component, reference symbol $d_2$ represents the airspace between the first and second lens components, reference symbol $d_4$ represents the airspace between the second and third lens components, reference symbols $n_1$, $n_2$, $n_3$, and $n_4$ respectively represent refractive indices of the first lens component, second lens component and respective lenses constituting the third lens component, and reference symbols $\nu_1$, $\nu_2$, $\nu_3$, and $\nu_4$ respectively represent Abbe's numbers of the first lens component, second lens component and respective lenses constituting the third lens component.

2. A microscope objective according to claim 1, in which said microscope objective has the following numerical data:

| f = 1.0 | | N.A. = 0.13 | $\beta = -4X$ | |
|---|---|---|---|---|
| W.D. = 0.5114 | | | Petzval's sum = $-0.08$ | |
| $r_1 = -0.6871$ | | | | |
| | $d_1 = 0.0351$ | $n_1 = 1.48749$ | $\nu_1 = 70.15$ | |
| $r_2 = 0.3159$ | | | | |
| | $d_2 = 0.1183$ | | | |
| $r_3 = 0.8103$ | | | | |
| | $d_3 = 0.1291$ | $n_2 = 1.83400$ | $\nu_2 = 37.19$ | |
| $r_4 = -1.1821$ | | | | |
| | $d_4 = 0.3404$ | | | |
| $r_5 = -0.7925$ | | | | |
| | $d_5 = 0.0869$ | $n_3 = 1.62588$ | $\nu_3 = 35.70$ | |
| $r_6 = 0.6727$ | | | | |
| | $d_6 = 0.0817$ | $n_4 = 1.49250$ | $\nu_4 = 81.90$ | |
| $r_7 = -0.4608$ | | | | |
| | $d_7 = 0.0035$ | | | |
| $r_8 = -10.7743$ | | | | |
| | $d_8 = 0.0526$ | $n_5 = 1.51728$ | $\nu_5 = 69.56$ | |
| $r_9 = -0.9174$ | | | | | wherein reference symbol f represents the focal length of the lens system as a whole, reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

3. A microscope objective according to claim 1, in which said microscope objective has the following numerical data:

| f = 1.0 | | N.A. = 0.13 | $\beta = -4X$ | |
|---|---|---|---|---|
| W.D. = 0.5115 | | | Petzval's sum = $-0.06$ | |
| $r_1 = -0.7588$ | | | | |
| | $d_1 = 0.0351$ | $n_1 = 1.48749$ | $\nu_1 = 70.15$ | |
| $r_2 = 0.3113$ | | | | |
| | $d_2 = 0.1183$ | | | |
| $r_3 = 0.7592$ | | | | |
| | $d_3 = 0.1292$ | $n_2 = 1.83481$ | $\nu_2 = 42.82$ | |
| $r_4 = -1.4720$ | | | | |
| | $d_4 = 0.3387$ | | | |
| $r_5 = -0.9547$ | | | | |
| | $d_5 = 0.0958$ | $n_3 = 1.60342$ | $\nu_3 = 38.01$ | |
| $r_6 = 0.5966$ | | | | |
| | $d_6 = 0.0829$ | $n_4 = 1.49250$ | $\nu_4 = 81.90$ | |
| $r_7 = -0.5126$ | | | | |
| | $d_7 = 0.0035$ | | | |
| $r_8 = -5.2782$ | | | | |
| | $d_8 = 0.0361$ | $n_5 = 1.50378$ | $\nu = 66.81$ | |
| $r_9 = -0.8206$ | | | | | wherein reference symbol f represents the focal length of the lens system as a whole, reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

4. A microscope objective according to claim 1, in which said microscope objective has the following numerical data:

| f = 1.0 | | N.A. = 0.13 | $\beta = -4X$ | |
|---|---|---|---|---|
| W.D. = 0.5199 | | | Petzval's sum = $-0.055$ | |
| $r_1 = -0.8971$ | | | | |
| | $d_1 = 0.0697$ | $n_1 = 1.48749$ | $\nu_1 = 70.15$ | |
| $r_2 = 0.6692$ | | | | |
| | $d_2 = 0.00003$ | | | |
| $r_3 = 1.4099$ | | | | |
| | $d_3 = 0.1396$ | $n_2 = 1.74000$ | $\nu_2 = 31.70$ | |
| $r_4 = -0.5093$ | | | | |
| | $d_4 = 0.0959$ | | | |
| $r_5 = -0.2325$ | | | | |
| | $d_5 = 0.2006$ | $n_3 = 1.63636$ | $\nu_3 = 35.37$ | |
| $r_6 = 0.9615$ | | | | |
| | $d_6 = 0.1771$ | $n_4 = 1.49700$ | $\nu_4 = 81.34$ | |
| $r_7 = -0.3576$ | | | | |
| | $d_7 = 0.0027$ | | | |
| $r_8 = 10.1088$ | | | | |
| | $d_8 = 0.0950$ | $n_5 = 1.48749$ | $\nu_5 = 70.15$ | |
| $r_9 = -0.7544$ | | | | | wherein reference symbol f represents the focal length of the lens system as a whole, reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

5. A microscope objective according to claim 1, in which said microscope objective has the following numerical data:

| f = 1.0 | | N.A. = 0.13 | $\beta = -4X$ | |
|---|---|---|---|---|
| W.D. = 0.5162 | | | Petzval's sum = $0.04$ | |
| $r_1 = -1.1505$ | | | | |
| | $d_1 = 0.0625$ | $n_1 = 1.51874$ | $\nu_1 = 64.48$ | |
| $r_2 = 0.2795$ | | | | |
| | $d_2 = 0.1045$ | | | |
| $r_3 = 0.6033$ | | | | |
| | $d_3 = 0.1342$ | $n_2 = 1.74000$ | $\nu_2 = 31.70$ | |
| $r_4 = -1.3191$ | | | | |
| | $d_4 = 0.2508$ | | | |
| $r_5 = -1.0020$ | | | | |
| | $d_5 = 0.1141$ | $n_3 = 1.64769$ | $\nu_3 = 33.80$ | |
| $r_6 = 0.5857$ | | | | |
| | $d_6 = 0.1004$ | $n_4 = 1.49250$ | $\nu_4 = 81.90$ | |
| $r_7 = -0.4545$ | | | | |
| | $d_7 = 0.0276$ | | | |
| $r_8 = -2.2735$ | | | | |
| | $d_8 = 0.0514$ | $n_5 = 1.49250$ | $\nu_5 = 81.90$ | |
| $r_9 = -0.7324$ | | | | | wherein reference symbol f represents the focal length of the lens system as a whole, reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

6. A microscope objective according to claim 1, in which said microscope objective has the following numerical data:

| f = 1.0 | | N.A. = 0.13 | $\beta = -4X$ | |
|---|---|---|---|---|
| W.D. = 0.5179 | | | Petzval's sum = $-0.05$ | |
| $r_1 = -0.6594$ | | | | |
| | $d_1 = 0.0631$ | $n_1 = 1.48749$ | $\nu_1 = 70.15$ | |
| $r_2 = 0.2964$ | | | | |
| | $d_2 = 0.1058$ | | | |
| $r_3 = 0.6718$ | | | | |
| | $d_3 = 0.1347$ | $n_2 = 1.78300$ | $\nu_2 = 36.15$ | |
| $r_4 = -1.0697$ | | | | |
| | $d_4 = 0.2585$ | | | |
| $r_5 = -1.0457$ | | | | |
| | $d_5 = 0.1200$ | $n_3 = 1.64769$ | $\nu_3 = 33.80$ | |
| $r_6 = 0.5717$ | | | | |

| -continued | | | |
|---|---|---|---|
| $r_7 = -0.4812$ | $d_6 = 0.1088$ | $n_4 = 1.49250$ | $\nu_4 = 81.90$ |
| $r_8 = -2.4230$ | $d_7 = 0.0283$ | | |
| $r_9 = -0.0521$ | $d_8 = 0.0521$ | $n_5 = 1.48759$ | $\nu_5 = 70.15$ | wherein reference symbol f represents the focal length of the lens system as a whole, reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, and reference symbols $\nu_1$ through $\nu_5$ respectively represent Abbe's numbers of respective lenses.

* * * * *